Patented Oct. 19, 1948

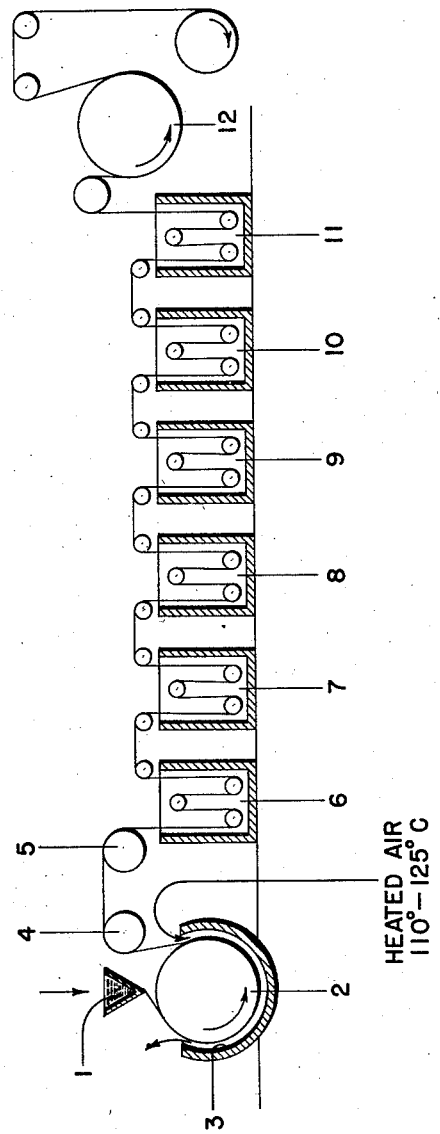

2,451,768

UNITED STATES PATENT OFFICE 2,451,768

REGENERATED CELLULOSE FILM MANUFACTURE

James Burton Nichols, Wilmington, Del., assignor to E. I. du Pont de Nemours & Company, Wilmington, Del., a corporation of Delaware Application March 13, 1945, Serial No. 582,583

7 Claims. (Cl. 18—57)

This invention relates to regenerated cellulose structures. More particularly, it relates to regenerated cellulose films having a hitherto unattainable combination of high transparency with durability and toughness, and to a process for preparing such films.

Regenerated cellulose film, as obtained by the well known wet regeneration process, has achieved outstanding commercial success, one of the chief reasons for its appeal to the public being its remarkable clarity. Nevertheless, it is not free of certain shortcomings, of which the most serious are relatively poor tear resistance and unsatisfactory durability under conditions of low temperature and low humidity. The latter defect may be at least partially remedied by addition of softening agents to the film, but this introduces another problem since the moistureproof coatings generally used with regenerated cellulose films do not adhere as well to softened films, particularly if the film contains a high proportion of softening agent. Another disadvantage of regenerated cellulose film produced by the wet regeneration process resides in its nonuniformity in all three dimensions, the film having less elongation and lower tearing strength in the direction in which tension was applied during formation. The trade has long recognized the need for a regenerated cellulose sheet characterized by good clarity, high tear resistance, uniformity in all directions, toughness under cold, dry conditions even without a softener, and good anchorage for moistureproof coatings. In particular, the combination of outstanding toughness with high transparency has long been desired.

The defects referred to above are intimately associated with the manner of forming the regenerated cellulose sheet. This is currently done by extruding an alkaline solution of cellulose xanthate into an acid coagulating bath where it is "salted out" to form a weak, highly swollen, water-insoluble gel having a water content one-third to one-half that of the original solution. The xanthate groups are simultaneously decomposed by the acid bath, thereby regenerating the cellulose. However, apparently because of the swollen loose structure of the gel, the cellulose crystallites do not become entangled and there is little opportunity for the formation of reinforcing pseudo-chemical bonds such as hydrogen bonds. This factor is believed to be responsible for the weakness of the final sheet in the respects mentioned above. This theory is substantiated by X-ray diffraction patterns which indicate considerable orientation in the direction of formation of the sheet, also orientation of the crystallites with respect to the plane of the sheet.

A principal object of this invention, therefore, is to prepare in a simple, economical and facile manner, regenerated cellulose film having unusually good clarity, high tear resistance, substantial uniformity of elongation and tear resistance in all directions, toughness throughout a wide range of temperature and humidity conditions even without the aid of softener, and satisfactory anchorage for moistureproofing coatings. Further objects will appear hereinafter.

These objects are accomplished by my invention which comprises casting viscose on a support, evaporating water from the cast film at a rate sufficient to reduce the water content of the film to less than 45% by weight and preferably to less than 20%, before irreversible gelation has taken place, i. e., before the film has lost its water solubility, regenerating the film in a non-swelling liquid regenerating medium, washing the film and drying it preferably on a smooth surface.

By "non-swelling liquid regenerating medium" is meant a regenerating liquid which produces no increase in the thickness of a dried viscose sheet (containing preferably less than 20% water) when the latter is immersed in the liquid. It is a matter of a simple test to determine whether or not a regenerating liquid is non-swelling as defined here, since the thickness of a viscose sheet before and after immersion in the liquid can be readily measured by means of a standard thickness gauge. In the description that follows, representative examples of such regenerating media are given, including acidic-alcoholic liquids which regenerate at ordinary temperature because of their acidic nature, and hot organic liquids whose regenerating action is due to their high temperature.

The cellulose from which the viscose is prepared may be any of the commercially available cotton linters or wood pulps having good resistance to degradation and sufficiently high degrees of polymerization to be able to retain a degree of polymerization of at least 500, and preferably 550–600 glucose units in the viscose. Viscose containing cellulose having a degree of polymerization of 450 is usable, but the dry-cast films prepared from it have only one-half the durability of films prepared from viscose made from unaged alkali cellulose having a degree of polymerization of approximately 600. The salt index of the viscose should be above one and preferably above two. Above this limit the salt index is not critical; however, high salt index viscose tends to yield films of less satisfactory transparency.

The viscose used is preferably of normal cellulose content, about 7-9%, though viscoses containing up to 15% cellulose can be used. The alkali content is about 6%, but viscoses having low alkali to cellulose ratios, e. g., 4 to 7 or 5 to 8.5, may be used to obtain a high gloss on the final sheet, at some sacrifice in toughness. The use of a small amount of wetting agent in the viscose is desirable as this tends to avoid the formation of pin holes in the film when the viscose is cast on a support.

A brief pretreatment of the cast viscose layer with water or a volatile alcohol to leach out some caustic before drying is of assistance in obtaining better clarity in the finished product without loss of toughness. Ethyl alcohol is preferred for such a pretreatment because the subsequent evaporation is more rapid, giving less opportunity for premature regeneration. It is not necessary to preheat the viscose before extruding it, though this may be done if desired, provided the viscose is not held at elevated temperature long enough to produce injurious decomposition of xanthate.

In order to obtain films having the desired combination of transparency and toughness, it is necessary to control the heat-dehydration step so that the film is dried to a water content not exceeding 45%, preferably about 10 to about 20%, before sufficient xanthate has been decomposed to produce an irreversible coagulation of the cellulose. This point is at approximately 0.15 mol of combined xanthate per glucose unit of the cellulose, as measured by iodine titration of the coagulated film after washing out sulfur compounds with cold sodium chloride solution.

The support (which may be stationary, e. g., a glass or steel plate, or moving, e. g., a rotating drum or a continuous belt, suitably surfaced) may be at ordinary room temperature, between 15° and 25° C. Preferably, however, it is heated, care being taken not to exceed 120° C. to avoid premature decomposition of the xanthate. An optimum temperature range for industrial operation is 90°-110° C.

Preferably, dehydration of the cast film is carried out by means of a hot, dry, inert gas such as air or nitrogen, circulating over the surface of the thin layer of viscose. It is essential for good transparency of the film to remove water fast enough to prevent surface crystallization of salts and consequent roughening or "etching" of the surface. This is done by using a dry gas at a temperature of at least 75° C., preferably 110°-120° C. but not exceeding 150° C. It is particularly essential that the inert gas circulate rapidly, the result of this rapid circulation being apparently to cool superficially the viscose during drying and thus retard the rate of xanthate decomposition and premature coagulation. The rate of circulation of the gas with respect to the film should be not less than 400 ft./min. and should preferably be above 1000 ft./min. When this critical factor is not observed, e. g., when dehydration is done in a stagnant or slowly moving hot atmosphere, there is a striking difference in clarity between films so obtained and films prepared in accordance with the process involving a rapidly circulating gas, all other conditions being the same.

The time necessary to complete the dehydration to the desired point varies with the other factors discussed above. Dehydration should be stopped before the film has become too fragile to handle. Under the preferred commercial operating conditions, which are a support temperature of 90°-110° C., an air temperature of 100°-130° C. and a rate of circulation of 1500 ft./min., sufficient dehydration is in general obtained in 1-3 minutes. The water content of the sheet is critical since, after dehydration, very little further removal of water is possible before the structure is set permanently by the regenerating liquid medium; hence it is essential that the structure after drying possess the desired closely packed arrangement. Further shrinkage may occur during immersion in the regenerating liquid.

The heat-dehydrated, still soluble film is, in accordance with the principles of my invention, regenerated in any non-swelling liquid regenerating medium. The preferred regenerating agents for producing transparent, tough films are alcoholic baths containing a small proportion of acid. In these baths, any convenient alcohol may be used; suitable alcohols are methanol, ethanol, isopropanol, butanol, ethylene glycol, etc. Any strong inorganic or organic acid may be used such as, for example, hydrochloric, sulfuric, phosphoric, trichloracetic acids, etc., and it is used preferably in concentrations from 1 to 10% by weight. Water may be present in the alcoholic acid bath if a rapidly regenerating acid such as hydrochloric acid is present to fix the structure before injurious swelling can occur. Preferably, the water content should not exceed 50% by volume. The bath may be at any desired temperature but in general a temperature between 10° and 50° C. is preferred. This treatment is desirably followed by treatment with an aqueous acid bath to complete the regeneration. The water content of this second bath is relatively unimportant as long as regenerating acid is present. The high clarity and toughness of films obtained by thus regenerating concentrated cellulose xanthate sheets is in sharp contrast to the results observed when a film of normal cellulose content is subjected to the action of an acid alcoholic bath. In this case, the rapid setting action leads to a weak, tender film having poor dry properties. Instead of a liquid alcoholic acid bath, regeneration may be accomplished by subjecting the dried sheet to the action of a hot, inert organic liquid such as tetrachloroethylene, kerosene, aromatic hydrocarbons, etc. . . . or of a hot, normally coagulating organic liquid such as glycerol or ethylene glycol. Such a liquid is desirably used at a temperature of about 90° to about 150° C.

Before regeneration, the dried sheet may be washed with methyl alcohol in order to remove some of the caustic. This treatment improves clarity without loss of toughness.

After regeneration, the cellulose sheet is washed free of salts with water and/or with a dilute acid bath to decompose any residual sulfur compounds attached to the cellulose. An ammonium sufate bath may be used previous to the dilute acid bath to remove salts likely to produce gaseous products in the acid bath, which might make bubbles in the film. If desired, the sheet is desulfurized with hot caustic.

Finally, after purification and washing, the sheet is dried, preferably under slight two-dimensional tension. To insure maximum clarity, the film should be dried on a smooth surface with the same side of the film originally in contact with the casting support also in contact with the smooth drier surface; otherwise a satiny surface haze may develop on the film. The smooth surface is desirably heated to a temperature not exceeding 120° C. in order to accelerate drying.

The practice of the process of my invention, and the salient characteristics of the film thereby produced are further illustrated in the following examples. Percentages are by weight unless otherwise indicated.

EXAMPLE I

This example illustrates the preparation of cellulose film by a drum-casting procedure and is to be read with reference to the accompanying drawing wherein is diagrammatically illustrated an arrangement of film-forming apparatus particularly suited for the practice of my invention.

A viscose solution containing 8.5% cellulose (having a degree of polymerization of about 500–550 glucose units) and 6.5% sodium hydroxide, and having a salt index of about 5, is prepared from a commercial wood pulp (Brown hardwood pulp) by customary methods but with no aging of the alkali cellulose. To the solution is added 0.2% (based on the weight of cellulose) of Nopco oil #1409 (a sulfonated oil wetting agent sold by the National Oil Products Co.). This solution is cast at room temperature from a hopper 1 onto the polished surface of a heated stainless steel drum 2 (90° C.) rotating at a surface speed of 6 feet per minute. The drum is enclosed by a jacket 3 which permits the circulation of heated air over the surface of the film. The film is rapidly dried by a current of air at 120° C. moving over its surface at a speed of approximately 1500 ft./min. As soon as the water content of the film reaches approximately 30%, the sheet is stripped from the drum. The cellulose is then regenerated by passing the film per guide rolls 4 and 5 and through a 1:1 ethanol-water bath 6 containing sufficient hydrochloric acid to have an acidity of 0.6 N, the regenerating bath being at 20°–25° C. After substantially complete regeneration, the film is washed 4 minutes in water bath 7 to remove the soluble salts, desulfured by treatment with 0.3% aqueous sodium hydroxide bath 8 at 90° C. for one minute, and finally given two more water washes 9 and 10. Optionally the film may pass through the conventional softening bath 11 before passing over the drying rolls. The film is dried in contact with polished rolls at a surface temperature of 100° C. The film so obtained has the same excellent clarity as ordinary wet-cast regenerated cellulose film of the same thickness. It is much superior to the latter in tearing strength, toughness, and durability, as shown by the following table.

Table I

| Property | Wet Cast Films | | | | Films made by process of this invention, unsoftened | |
|---|---|---|---|---|---|---|
| | Unsoftened | | Softened with 15% Glycerol | | | |
| | MD [1] | TD [2] | MD | TD | MD | TD |
| Tear resistance, at 75° F., 35% R. H., in g | 1.5 | 2.0 | 2 | 4 | 16.1 | 17.9 |
| Tumbling durability at— | | | | | | |
| 75° F., 35% R. H | 20–30 | | 70 | | 253. | |
| 0° F., 35% R. H | 1 | | 5–15 | | 241. | |
| 85° F., 7% R. H | 1 | | 3–15 | | 142. | |
| 0° F., 7% R. H | 1 | | 1 | | 22. | |
| Anchorage of coating | Fair | | Fair | | Good. | |
| X-ray Orientation | Planar, with some uniaxial. | | Planar, with some uniaxial. | | Random. | |

[1] MD=machine direction.
[2] TD=transverse direction.

The tearing strength of these regenerated cellulose films is determined on an instrument which is a modification of the Elmendorf paper tester. This tear tester is a force integrating instrument and the tearing strength as determined with it is the force in grams integrated over the distance an initial tear is extended and is reported as the total force in grams required to extend the tear. The force required to start a tear from the edge of the film is not measured by this method. The instrument is calibrated to give a direct reading of the tearing strength in grams for a 2 inch tear when a standard 0.00088 inch thick test specimen is used. This specimen is cut accurately 2 in. x 2.5 in. and a slit exactly 0.5 in. long is cut at the midpoint of the 2 inch side of the sample. Several specimens are tested and the average strength reported. Films of other thicknesses than the standard 0.00088 inch may be tested in this tester by application of calibrated weights to the pendulum. The tearing strengths of films of different thicknesses are directly proportional to the squares of their thicknesses.

EXAMPLE II

A viscose containing 7% of cotton linters cellulose (reduced in the alkali cellulose stage to a degree of polymerization of 550 glucose units) and 6% of sodium hydroxide, having a salt index of 5.2, is cast on a glass surface and subjected to a stream of dry air at 100° C. and circulating at a rate of 1000 ft./min. for 3–4 minutes. At the end of this time the film is tack-free and contains 35–40% cellulose having 20–10% of water. The dry cellulose xanthate film thus obtained is then immersed for one minute in (a) a 2.2% solution of hydrogen chloride in methanol, (b) a 2.2% solution of hydrogen chloride in 50% aqueous methanol, and (c) a 2.2% solution of hydrogen chloride in water. The resulting regenerated cellulose film is immersed in 18% ammonium sulfate for 3 minutes to remove gas-forming products and then immersed for 3 minutes in a bath containing 4% sulfuric acid and 6% sodium sulfate to decompose residual insoluble sulfur compounds. After washing with water the film is dried at 105° C. on a glass surface, the same side of the film being in contact with the glass as during the dehydration step. The resulting very clear film has a tearing strength of 32 in both directions, as compared with an average of 2 for unsoftened, wet-cast cellulose film of the same thickness. When the heat-dehydrated film is regenerated in aqueous HCl alone, the film has only one-half the tearing strength of that regenerated as described above.

It is possible to dehydrate the cast viscose by means of a stream of low-humidity air at room temperature, e. g., 20°–25° C., instead of hot air as described above. In this case, however, dehydration takes much longer (about 30 minutes), and this method is therefore not very practical for commercial operation. Regardless of its temperature, the dehydrating, low-humidity gas must be circulated at a high speed, at least 400 ft./min., if transparency of the film is to be obtained.

EXAMPLE III

An unaged viscose solution having the composition of that of Example I but a salt index of 3.8 is cast and dehydrated as in Example I on a stainless steel drum heated at 90° C. and rotating at a surface speed of 2.6 ft./min., the air current (120° C.) moving at about 1500 ft./min. The dried film is regenerated by passing it through a glycerol bath kept at 100° C. The sheet is washed and purified as in Example II, then dried in contact with polished rolls at a surface temperature of 100° C. The resulting unsoftened film, 0.0006 inch thick, is highly transparent and possesses exceptionally good tearing strength and tumbling durability values even though no attempt was made to avoid considerable tension during the wet processing and drying which produced considerable orientation of the cellulose crystallites in the film. Tearing strength referred to 0.00088 inch thickness is 21 in the machine direction and 29 in the transverse direction. When tested for durability by the method described in U. S. Patent No. 2,279,339, this film was found to have durability values of 370 at 75° F., 35% R. H., 250 at 0° F., 35% R. H., 243 at 85° F., 7% R. H., and 88 at 0° F., 7% R. H. Corresponding values obtained with unsoftened wet-cast cellulose film are: 20–30 at 75° F., 35% R. H., 1 at 0° F., 35% R. H., 1 at 85° F., 7% R. H., and 1 at 0° F., 7% R. H.

Instead of casting the film on a conventional metal drum, belt, or the like, the viscose may be dry-cast on rewet cellulosic film of good clarity, thus giving a clear, composite film with fairly good adherence and good tear resistance. The dry-cast layer can be stripped from its cellulosic support. It is then very clear because the cellulosic support absorbs some of the alkali and salts from the viscose.

It will be apparent from the foregoing that the regenerated cellulose films produced by the process of my invention are characterized by high clarity and outstanding tear resistance under extreme conditions of temperature and humidity, even when they contain no softener. However, it is desirable for some purposes to soften these films and this can be done in the conventional manner, using any known softener such as glycerol. A suitable moistureproof coating may be applied to the regenerated cellulose film by any known method.

In contrast with the non-swelling baths used in the process of this invention, swelling baths like a saturated sodium chloride solution, and even somewhat acidic baths like a concentrated ammonium sulfate solution, give films having poor tearing strength in no way comparable with films regenerated in non-swelling media.

In view of their high durability, excellent transparency and outstanding tearing strength, even in very thin sheets (for example, 0.0005 inch thick, and without softener) the cellulose sheets obtainable by the present invention are useful for heavy duty wraps of all kinds, such as, for example, for wrapping heavy machine parts having sharp corners, sharp utensils, instruments, food such as fish, meat or dried vegetables, particulary when the contents must be inspected without opening the packages. Because of the better anchorage of moistureproof coating to the dry-cast film in comparison with ordinary softened cellulose film, the film of this invention is used where good waterproofness is needed, such as, for example, in tablecloths, aprons, or floor coverings. These films are also useful in applications where good sewing properties such as seam strength (in which the dry-cast cellulose films are equivalent to the transparent sheeting sold commercially as Pliofilm) are required. Since the dry-cast films also have greater elasticity when wet than ordinary cellulose films, they are particularly useful as casings for sausage, etc. Other uses include their lamination with other materials in thin sheets for extra heavy duty or for special applications requiring imperviousness to gases.

Since it is obvious that many changes and modifications can be made in my invention without departing from the spirit and scope thereof, it is to be understood that it is not to be limited except as defined in the appended claims.

I claim:

1. A process for preparing regenerated cellulose film from viscose which comprises extruding viscose on a support to form a viscose film, drying the viscose film in a stream of inert gas heated to a temperature of from 75° to 150° C., and circulating at a speed of at least 400 feet per minute with respect to the film until the water content of the film is reduced to less than 45% by weight before irreversible gelation takes place, and thereafter subjecting said film to the action of a non-swelling liquid regenerating medium until regeneration of the cellulose is substantially complete.

2. A process for preparing regenerated cellulose film from viscose which comprises extruding viscose on a support to form a viscose film, drying the viscose film in a stream of inert gas heated to a temperature of from 75° to 150° C., and circulating at a speed of at least 400 feet per minute with respect to the film until the water content of the film is reduced to about 10% to about 20% by weight before irreversible gelation takes place, and thereafter subjecting said film to the action of a non-swelling liquid regenerating medium until regeneration of the cellulose is substantially complete.

3. A process for preparing regenerated cellulose film from viscose which comprises extruding viscose on a support to form a viscose film, drying the viscose film on the support maintained at a temperature of from 90° to 110° C., in a stream of inert gas heated to a temperature of from 110° to 120° C., and circulating at a speed of at least 400 feet per minute with respect to the film until the water content of the film is reduced to about 10% to about 20% by weight before irreversible gelation takes place, and thereafter subjecting said film to the action of a non-swelling liquid regenerating medium until regeneration of the cellulose is substantially complete.

4. A process for preparing regenerated cellulose film from viscose which comprises extruding viscose on a support to form a viscose film, drying the viscose film in a stream of inert gas heated to a temperature of from 75° to 150° C., and circulating at a speed of at least 400 feet per minute with respect to the film until the water content of the film is reduced to less than 45% by weight before irreversible gelation takes place, and thereafter subjecting said film to the action of a non-swelling alcoholic bath containing from 1% to 10% by weight of a strong acid until regeneration of the cellulose is substantially complete.

5. A process for preparing regenerated cellulose film from viscose which comprises extruding viscose on a support to form a viscose film, drying the viscose film on a support maintained at a temperature of from 90° to 110° C., in a stream of inert gas heated to a temperature of from 110° to 120° C., and circulating at a speed of at least 400 feet per minute with respect to the film until the water content of the film is reduced to about 10% to about 20% by weight before irreversible gelation takes place, and thereafter subjecting said film to the action of a non-swelling alcoholic bath containing from 1% to 10% by weight of a strong acid until regeneration of the cellulose is substantially complete.

6. The process of claim 1 wherein the viscose has a salt index above 1 and contains cellulose having a degree of polymerization of from 550 to 600 glucose units.

7. A process for preparing regenerated cellulose film from viscose which comprises extruding viscose having a salt index above 1 and containing cellulose having a degree of polymerization of from 550 to 600 glucose units, on a support to form a viscose film, evaporating water from the viscose film at a rate sufficient to reduce the water content to less than 45% by weight before irreversible gelation takes place, and thereafter subjecting said film to the action of a non-swelling alcoholic bath containing from 1% to 10% by weight of a strong acid until regeneration of the cellulose is substantially complete.

JAMES BURTON NICHOLS.

REFERENCES CITED

The following references are of record in the file of this patent:

UNITED STATES PATENTS

| Number | Name | Date |
| --- | --- | --- |
| 791,385 | Waite | May 30, 1905 |
| 1,357,206 | Fuller | Oct. 26, 1920 |
| 1,576,531 | Mendel | Mar. 16, 1926 |
| 1,745,247 | Czapek et al. | Jan. 28, 1930 |
| 1,864,244 | Henderson | June 21, 1932 |
| 1,961,316 | Weingand | June 5, 1934 |
| 2,028,296 | Shoemaker | Jan. 21, 1936 |
| 2,284,028 | Ubbelohde | May 26, 1942 |

FOREIGN PATENTS

| Number | Country | Date |
| --- | --- | --- |
| 155,211 | Great Britain | Mar. 9, 1922 |
| 412,798 | Great Britain | July 5, 1934 |